(12) United States Patent
Lai et al.

(10) Patent No.: US 8,816,830 B2
(45) Date of Patent: Aug. 26, 2014

(54) MOTOR CONTROL SYSTEM AND THE METHOD OF CONTROLLING MOTOR

(75) Inventors: Chun-Cheng Lai, Miaoli (TW); Huang Hsiang Lin, Taichung (TW)

(73) Assignee: Legendaire Technology Co., Ltd., Taichung (TW)

( * ) Notice: Subject to any disclaimer, the term of this patent is extended or adjusted under 35 U.S.C. 154(b) by 458 days.

(21) Appl. No.: 13/213,482

(22) Filed: Aug. 19, 2011

(65) Prior Publication Data

US 2013/0043985 A1 Feb. 21, 2013

(51) Int. Cl.
| | |
|---|---|
| *G05B 11/01* | (2006.01) |
| *G08B 1/08* | (2006.01) |
| *G05D 23/00* | (2006.01) |
| *G06F 3/00* | (2006.01) |
| *F04B 49/06* | (2006.01) |
| *H02P 1/24* | (2006.01) |

(52) U.S. Cl.
USPC ............ 340/12.32; 340/12.23; 340/538.16; 340/533; 340/288; 700/278; 710/1; 710/19; 417/44.1; 318/727; 318/286

(58) Field of Classification Search
CPC .. H04B 3/54; H04B 3/542; H04B 2203/5462; H04B 2203/5441; H04B 2203/5445; H05B 37/02
USPC ............................... 340/12.32, 12.23
See application file for complete search history.

(56) References Cited

U.S. PATENT DOCUMENTS

| | | | | |
|---|---|---|---|---|
| 4,334,182 | A * | 6/1982 | Landino | 318/808 |
| 4,527,247 | A * | 7/1985 | Kaiser et al. | 700/278 |
| 5,951,394 | A * | 9/1999 | Pariseau | 454/61 |
| 6,278,357 | B1 * | 8/2001 | Croushore et al. | 375/259 |
| 6,587,037 | B1 * | 7/2003 | Besser et al. | 340/854.9 |
| 7,770,847 | B1 * | 8/2010 | Severson | 246/3 |
| 2002/0079859 | A1 * | 6/2002 | Lumsden | 318/727 |
| 2003/0062643 | A1 * | 4/2003 | Bulgrin et al. | 264/40.1 |
| 2011/0267178 | A1 * | 11/2011 | Nishihara et al. | 340/12.39 |

* cited by examiner

*Primary Examiner* — Fekadeselassie Girma
(74) *Attorney, Agent, or Firm* — Tracy M. Heims; Apex Juris, pllc

(57) ABSTRACT

The present invention further provides a motor control system, which controls a motor through a power line. The motor control system includes a control apparatus and an actuation apparatus. The control apparatus includes a controller and a first communication module electrically connected to the controller. The controller receives a command and converts the command into electrical control signals. The first communication module receives the electrical control signals from the controller and transmits the electrical control signals to the power line. The actuation apparatus includes a second communication module and a motor actuator electrically connected to the second communication module. The second communication module is connected to the power line to receive the electrical control signals from the control apparatus and convert the electrical control signals into a command. The motor actuator receives the command from the second communication module to change the power supplying to the motor.

9 Claims, 4 Drawing Sheets

MOTOR CONTROL SYSTEM AND THE METHOD OF CONTROLLING MOTOR

BACKGROUND OF THE INVENTION

1. Field of the Invention

The present invention relates generally to a motor, and more particularly to a motor control system and a method of controlling a motor.

2. Description of the Related Art

Motor is a common device in vehicle, machines and some consumer electronic devices. Motors may provide a rotation with a consistent speed to drive an object for rotation or movement. As the technology improving, some devices need a driving power with various speeds that the conventional motors with single speed cannot afford such devices. Therefore, an improved motor equipped with a controller to change voltage, current or frequency to change the speed of the motor is provided to the market for various requirements.

In such motor of adjustable speed, it needs a power line to connect the motor, a driver, and the controller, and furthermore, it also needs a signal wire to transmit the control signals that it is complex to wire these three units. While the motor has the function of monitoring, the wire arrangement is more complex. In spite of higher cost, the complex wire arrangement may damage the motor by the wrong wire connection. As a result, the conventional control system of motor still has some drawbacks to be solved.

SUMMARY OF THE INVENTION

The primary objective of the present invention is to provide a control system of motor and a control method thereof, which has the power line to serve both functions of power supply and signal transmission.

The present invention further provides a motor control system, which controls a motor through a power line, wherein the power line also supplies the motor power. The motor control system includes a control apparatus which includes a controller and a first communication module electrically connected to the controller, wherein the controller receives a command and converts the command into electrical control signals, and the first communication module receives the electrical control signals from the controller and transmits the electrical control signals to the power line; and an actuation apparatus includes a second communication module and a motor actuator electrically connected to the second communication module and the motor, wherein the second communication module is connected to the power line to receive the electrical control signals from the control apparatus and convert the electrical control signals into a command, and the motor actuator receives the command from the second communication module to control the motor.

The present invention further provides a method of controlling a motor through a power line, wherein the power line supplies the motor power. The method includes the steps of:

A. Input a command and converting the command into electrical control signals;

B. Transmit the electrical control signals to the power line;

C. Receive both the electrical control signals and the power from the power line; and D. Convert the electrical control signals into a command to adjust the power supplying to the motor according to the command.

The present invention further provides an actuation apparatus, which receives a power and electrical control signals from a power line to control a motor according to the electrical control signals. The actuation apparatus includes a motor actuator connected to the motor; and a communication module receiving the electrical control signals from the power line and converting the electrical control signals into a command to control the motor actuator to adjust the power providing to the motor.

DETAILED DESCRIPTION OF THE INVENTION

Figure 1:
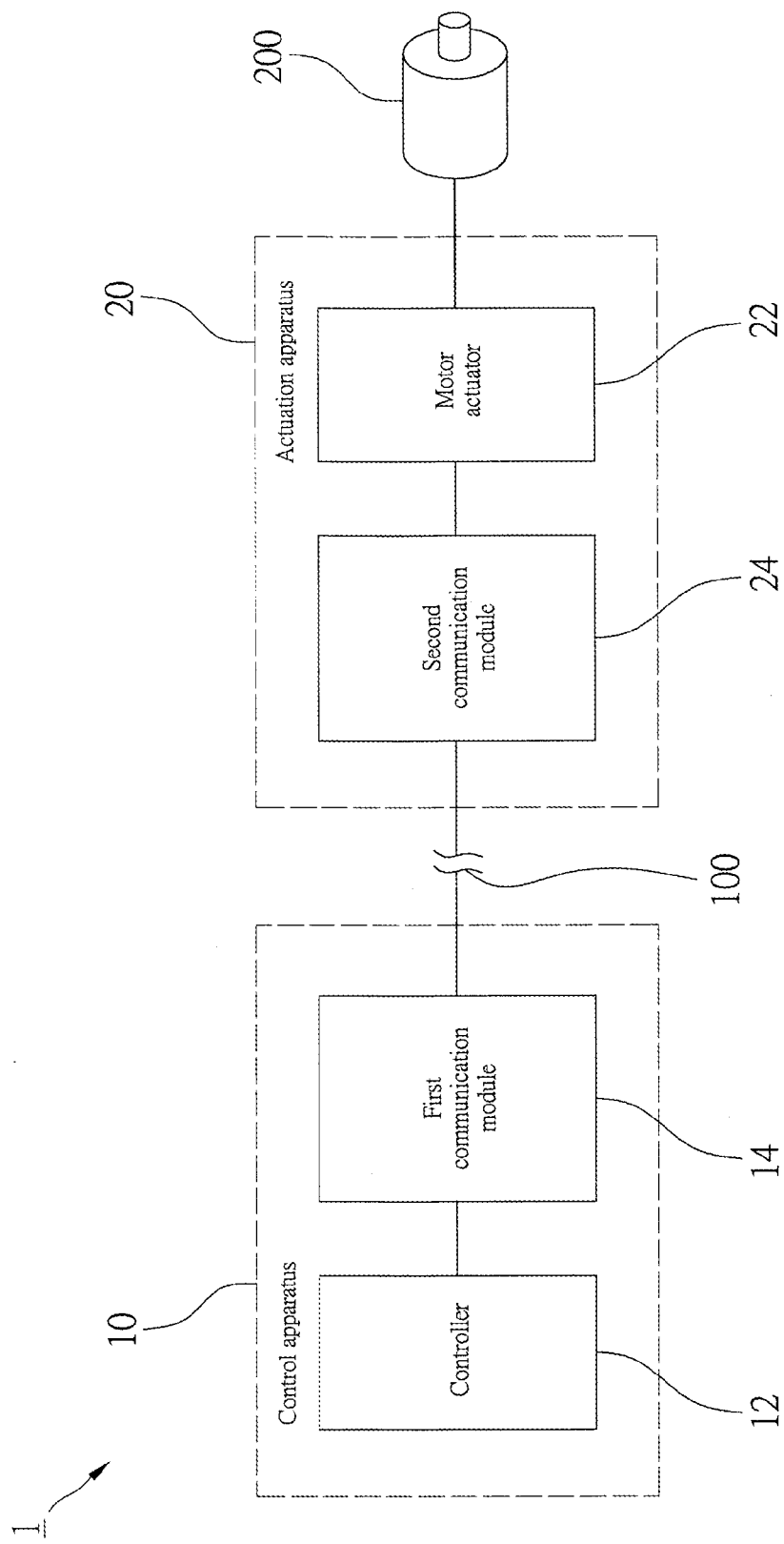
FIG. 1 is a block diagram of the control system of a first preferred embodiment of the present invention.

FIG. 1 shows a control system 1 of a DC brushless motor 200 the first preferred embodiment of the present invention. The control system 1 includes a power line 100 to supply the motor 200 power. In the present invention, the power line 100 supplies AC power.

The control system 1 includes a control apparatus 10 and an actuation apparatus 20.

Figure 2:
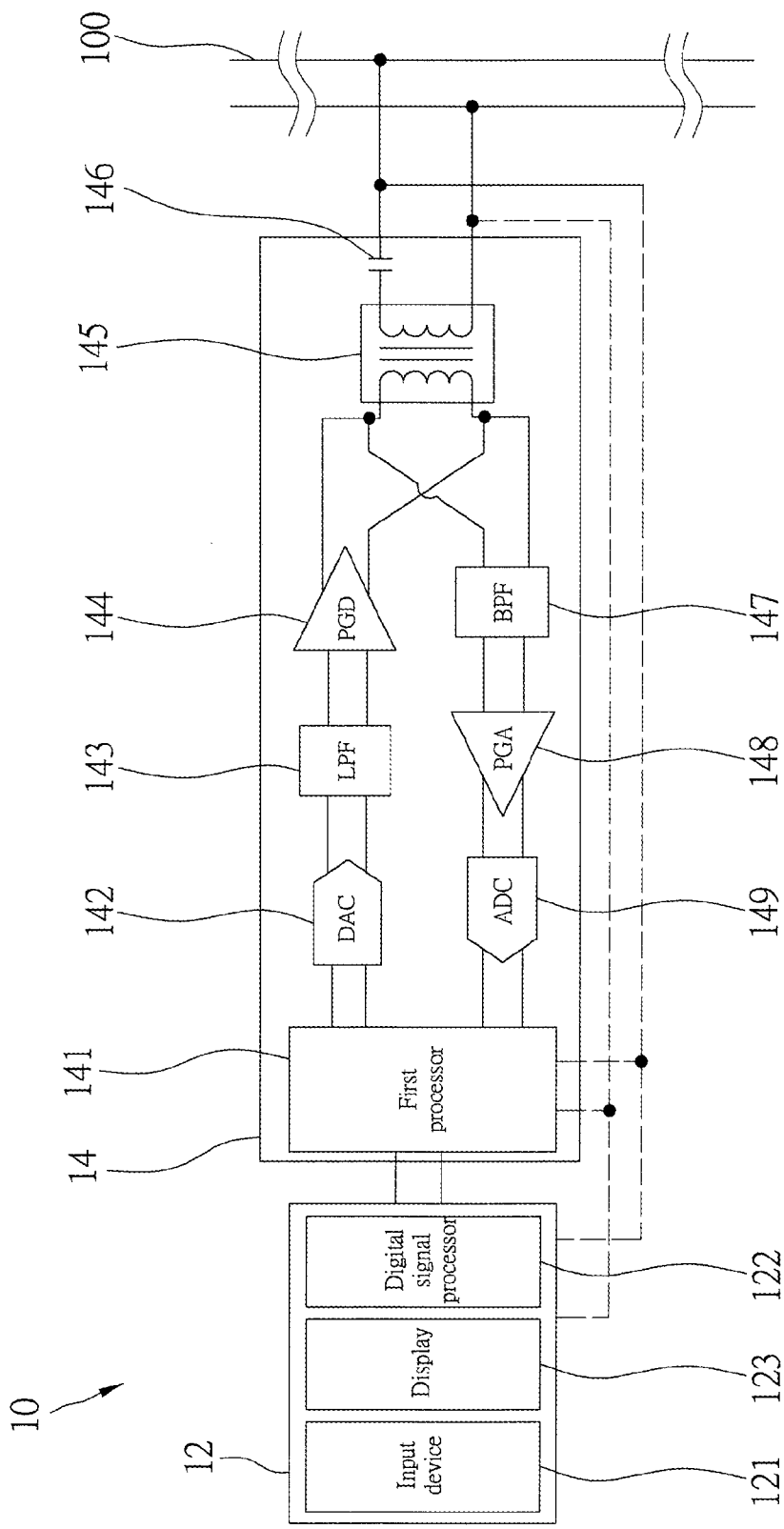
FIG. 2 is a block diagram of the control unit of the first preferred embodiment of the present invention.

The control apparatus 10 includes a controller 12 and a first communication module 14. As shown in FIG. 2, the controller 12 has an input device 121, a digital signal processor (DSP) 122, and a display 123. In the present embodiment, the input device 12 is a keyboard for user to input command. It also may includes a mouse, speed controller, or other relative device. The DSP 122 may transform the commands into digital electrical control signals. The display 123 may show what the user inputs. In practice, the controller may be industrial computer, PC, embedded controller, or other relative devices.

The first communication module 14 is connected to the controller 12 to receive the control signals from the controller 12. The first communication module 14 further is connected to the power line 100 to transmit the control signals through the power line 100. The first communication module 14 includes a first processor 141, a first digital analog converter (DAC) 142, a first low-pass filter (LPF) 143, a first programmable gain driver (PGD) 144, and a first coupling transformer 145. The first processor controls the first DAC 142 to convert the digital control signals from the controller 12 into analog control signals. Next, the first LPF 143 filters the high frequency noise of the analog control signals out, and then sends the filtered analog control signals to the first PGD 144. The first PGD 144 stabilizes the filtered analog control signals from the first LPF 143 by adjusting the gain, and the first coupling transformer 145 couples the analog control signals, and then the analog control signals are transmitted to the power line 100. In addition, there is a first coupling capacitor 146 between the first coupling transformer 145 and the power line 100 to block DC and low frequency AC out that the first coupling transformer 145 may have a stable input and output.

Figure 3:
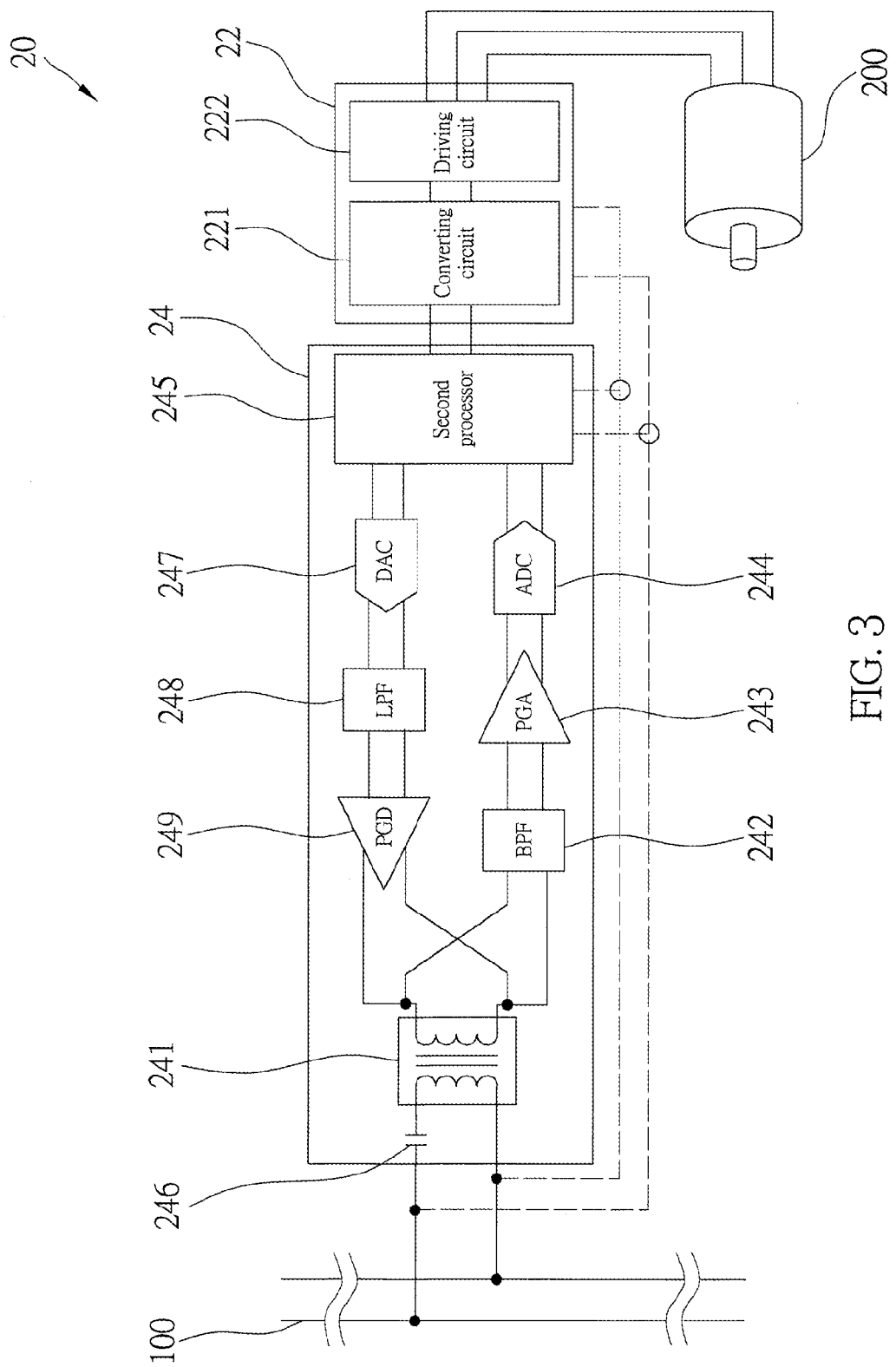
FIG. 3 is a block diagram of the actuation apparatus of the first preferred embodiment of the present invention.

The actuation apparatus 20 includes a motor actuator 22 and a second communication module 24. As shown in FIG. 3, the motor actuator 22 is connected to the DC brushless motor 200, and has a power converting circuit 221 and a driving circuit 222. The power converting circuit 221 converts AC into DC and transmits DC modulation power to the motor 200 through the driving circuit 222 to driving the motor via the power line 100.

The second communication module 24 is connected to the power line 100 to receive both of the power and the analog control signals. The second communication module 24 includes a second coupling transformer 241, a second band-pass filter (BPF) 242, a second programmable gain amplifier (PGA) 243, a second analog digital converter (ADC) 244, and a second processor 245. The second BPF 242 receives the analog control signals in the power line 100 through the second coupling transformer 241 and filters predetermined band of the analog control signals out, and then, the filtered analog control signals are transmitted to the second PGA 243. The second PGA 243 may stabilize the filtered analog control signals by adjusting the gain and transmit them to the second ADC 244 to convert the analog control signals into digital control signals. Next, the digital control signals are transmitted to the second processor 245 that will control the power converting circuit 221 to provide a DC with specific voltage and current according to the control signals. The DC will be provided to the motor 200 through the driving circuit 222 to control the motor 200. In addition, there is a second coupling capacity 246 between the second transformer 241 and the power line 100 that the second coupling transformer 241 may have a stable input and output.

The method of controlling the DC brushless motor 200 by the control system 1 includes the following steps:

A. Input a command via the controller 12, and convert the command into electrical control signals.

B. Transmit the electrical control signals to the power line through the first communication module 14.

C. Receive the electrical control signals in the power line by the second communication module 24.

D. Decode the electrical control signals to get a control command, and provide a power with specific voltage and current to the motor 200 according to the control command.

In the real process, the electrical control signals are converted from digital signals into analog signals by the first DAC 142 before the step B, and the analog signals will be converted into digital signals between the step C and the step D by the second ADC 244.

Therefore, the present invention may supply power and transmit control signal through the power line 100 to drive the motor 200 that it will have a simple wire arrangement.

In addition, the second communication module 24 of the actuation apparatus 20 may get real information of the running of the DC brushless motor 200 through the motor actuator 22 and feedback the information through the power line 100. The first communication module 14 of the control apparatus 10 receives the information in the power line 100 and transmits it to the controller 12. Next, the controller 12 decodes the information and show the information on the display 123 that operator may monitor the motor 200.

In order to achieve the objective of above, as shown in FIG. 2 and FIG. 3, the second communication module 24 further includes a second digital analog converter (DAC) 247, a second low-pass filter (LPF) 248, and a second programmable gain driver (PGD) 249. The first communication module further includes a band-pass filter (BPF) 147, a first programmable gain amplifier (PGA) 148, and a first analog digital converter (ADC) 149.

The second processor 245 of the second communication module 24 receives the information of the motor 200 through the motor actuator 22, and generates digital feedback signals according to the information. Next, the second DAC 247 converts the digital feedback signals into analog feedback signals, and transmits them to the second LPF 248 to filter high frequency noise in the analog feedback signals out. And then, the second LPF 248 transmits the filtered feedback signals to the second PGD 249 to stabilize the analog feedback signals by adjusting the gain. Finally, the analog feedback signals are transmitted to the power line 100 through the second coupling transformer 241.

The first BPF 147 of the first communication module 14 receives the analog feedback signals from the power line 100 through the first coupling transformer 145 to filter specific frequencies out, and transmits the filtered feedback signals to the first PGA 148. The first PGA 148 stabilizes the feedback signals by adjusting the gain, and transmits them to the first ADC 149 to convert the analog feedback signals into digital feedback signals. Finally, the digital feedback signals are transmitted to the controller 12.

The controller 12 receives the digital feedback signals and decodes them by the DSP 122 to show the information of the motor 200 on the display 123 for operator to monitor the motor 200.

Figure 4:
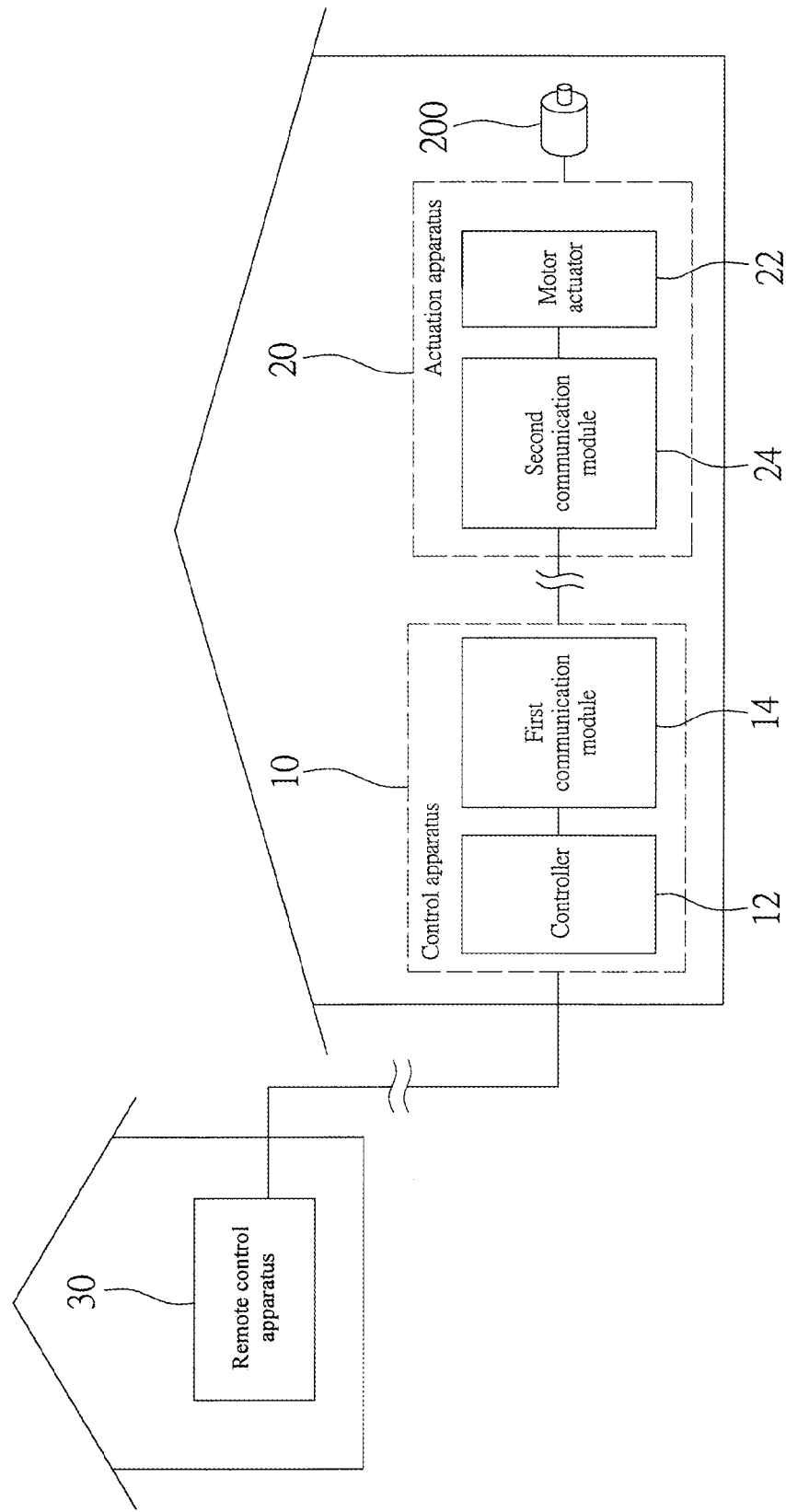
FIG. 4 is a block diagram of the control system of the first preferred embodiment of the present invention.

In order to provide the operator with remote control of the motor 200, as shown in FIG. 4, the present invention further provides a remote control apparatus 30 that operator may control the motor 200 in another place through the remote control apparatus 30. The contracture of the remote control apparatus 30 basically is the same as the control apparatus 10, except for a communication interface (not shown) to communicate with the controller 12 of the control apparatus through internet, I2C, UART, SPI, or other relative communications to control and monitor the motor 200 in other place.

In the present invention, the actuation apparatus 20 is mounted on the DC brushless motor 200 to reduce the size of the control system. However, it is easy to understand that the actuation apparatus 20 may be provided at any suitable positions other than on the motor 200, and it may serve the same function.

In the present invention, the control apparatus 10 may be connected to the power line in any play, such as in other room of the building. However, it may provide a control apparatus on the motor directly that the operator may control the motor by the motor.

The control system 1 of the present invention may control other types of motors except for the DC brushless motor, such as stepper motor, inverter motor, or other types of motor, as long as provides the specific motor actuator to control the specific motor.

The circuit for signals transmission is only an example to explain the present invention. The main character of the present invention is that the power line serves both function of power supply and signal transmission in control of motor. Any equivalent structure and circuit is still in the scope of the present invention.

The description above is a few preferred embodiments of the present invention, and the equivalence of the present invention is still in the scope of claim construction of the present invention.

What is claimed is:

1. A motor control system, in which a motor is controlled through a power line, and the power line supplies the motor power in the same time, comprising:

a control apparatus including a controller and a first communication module electrically connected to the controller, wherein the controller receives a command and converts the command into electrical control signals, and the first communication module receives the electrical control signals from the controller and transmits the electrical control signals to the power line; and an actuation apparatus including a second communication module and a motor actuator electrically connected to the second communication module and the motor, wherein the second communication module is connected to the power line to receive the electrical control signals from the control apparatus and convert the electrical control signals into a command, and the motor actuator receives the command from the second communication module to control the motor;

wherein the first communication module includes a first processor and a first digital analog converter, wherein the first processor receives the electrical control signals from the controller to control the first digital analog converter to convert the electrical control signals from digital signals to analog signals, and the second communication module includes a second analog digital converter and a second processor, wherein the second analog digital converter the analog electrical control signals from the power line into digital electrical control signals, and the second processor receives the digital electrical control signals from the second analog digital converter to control the motor actuator according to the digital electrical control signals; and wherein the first communication further includes a low-pass filter, a first programmable gain driver, and a first coupling transformer, wherein the first low-pass filter filters the analog electrical control signals from the first digital analog convert, and the first programmable gain driver stabilizes the analog electrical control signals from the first low-pass filter filters by adjusting gains, and the coupling transformer transmits the analog electrical control signals from the first programmable gain driver to the power line; the second communication module further includes a second coupling transformer, a second band-pass filter, and a second programmable gain amplifier, wherein the second coupling transformer receives the analog electrical control signals from the power line, and the second band-pass filter filters the analog electrical control signals from the second coupling transformer, and the second programmable gain amplifier stabilizes the analog electrical control signals from the second band-pass filter by adjusting gains, and then transmits the analog electrical control signals to the second analog digital converter.

2. The motor control system as defined in claim 1, wherein the motor is a DC brushless motor, and the motor actuator of the actuation apparatus includes a power converting circuit and a driving circuit, and the second communication module of the actuation apparatus receives the electrical control signals from the power line to control the power converting circuit to convert the power into a DC modulation power with a predetermined voltage and a predetermined current, and the driving circuit supplies the DC modulation power to control the DC brushless motor.

3. A motor control system, in which a motor is controlled through a power line, and the power line supplies the motor power in the same time, comprising:
a control apparatus including a controller and a first communication module electrically connected to the controller, wherein the controller receives a command and converts the command into electrical control signals, and the first communication module receives the electrical control signals from the controller and transmits the electrical control signals to the power line; and
an actuation apparatus including a second communication module and a motor actuator electrically connected to the second communication module and the motor, wherein the second communication module is connected to the power line to receive the electrical control signals from the control apparatus and convert the electrical control signals into a command, and the motor actuator receives the command from the second communication module to control the motor;
wherein the second communication module of the actuation apparatus monitors the motor to generate feedback signals transmitting to the power line; the first communication module of the control apparatus receives the feedback signals from the power line, and the controller decodes the feedback signals from the first communication module to show information of the motor; and
wherein the second communication module includes a second processor and a second digital analog converter, wherein the second processor generates digital feedback signals, and the second digital analog converter converts the digital feedback signals from the second processor into analog feedback signals and transmits the analog feedback signals to the power line; the first communication module includes a first processor and a first analog digital converter, wherein the first processor receives the analog feedback signals from the power line, and the first analog digital converter converts the analog feedback signals from the first processor into digital feedback signals and transmits the digital feedback signals to the controller.

4. The motor control system as defined in claim 3, wherein the second communication module further includes a second low-pass filter, a second programmable gain driver, and a second coupling transformer, wherein the second low-pass filter filters the analog feedback signals from the second digital analog converter, and the second programmable gain driver stabilizes the analog feedback signals from the low-pass filter by adjusting gains and transmits the analog feedback signals to the power line through the second coupling transformer; the first communication module further includes a first coupling transformer, a first band-pass filter, and a first programmable gain amplifier, wherein the first coupling transformer receives the analog feedback signals from the power line, and the first band-pass filter filters the analog feedback signals from the first coupling transformer, and the first programmable gain amplifier stabilizes the analog feedback signals from the first band-pass filter by adjusting gains and transmits the analog feedback signals to the first analog digital converter.

5. An actuation apparatus, which receives a power and electrical control signals from a power line to control a motor according to the electrical control signals, comprising:
a motor actuator connected to the motor; and
a communication module receiving the electrical control signals from the power line and converting the electrical control signals into a command to control the motor actuator to adjust the power providing to the motor;
wherein the electrical control signals are analog signals, and the communication module includes an analog digital converter and a processor, wherein the analog digital converter receives the analog electrical control signals from the power line and converts the analog electrical control signals into digital electrical control signals, and the processor controls the motor actuator according to the digital electrical control signals; and
wherein the communication module further includes a coupling transformer, a band-pass filter, and a programmable gain amplifier, wherein the coupling transformer receives the analog electrical control signals from the power line, and the band-pass filter filters the analog electrical control signals from the coupling transformer, and the programmable gain amplifier stabilizes the analog electrical control signals from the band-pass filter by adjusting gains and transmits the analog electrical control signals to the analog digital converter.

6. The actuation apparatus as defined in claim 5, wherein the motor is a DC brushless motor, and the motor actuator of the actuation apparatus includes a power converting circuit and a driving circuit, and the communication module receives the electrical control signals from the power line to control the power converting circuit to convert the power into a DC modulation power with a predetermined voltage and a predetermined current, and the driving circuit supplies the DC modulation power to control the DC brushless motor.

7. The actuation apparatus as defined in claim 5, wherein the communication module monitors the motor through the motor actuator to generate feedback signals and transmits the feedback signals to the power line.

8. The actuation apparatus as defined in claim 7, wherein the communication module further includes a processor and a digital analog converter, wherein the processor monitors the motor through the motor actuator to generate the feedback signals, and the digital analog converter converters the feedback signals from digital signals into analog signals and transmits the analog feedback signals to the power line.

9. An actuation apparatus, which receives a power and electrical control signals from a power line to control a motor according to the electrical control signals, comprising:

a motor actuator connected to the motor; and a communication module receiving the electrical control signals from the power line and converting the electrical control signals into a command to control the motor actuator to adjust the power providing to the motor;

wherein the communication module monitors the motor through the motor actuator to generate feedback signals and transmits the feedback signals to the power line;

wherein the communication module further includes a processor and a digital analog converter, wherein the processor monitors the motor through the motor actuator to generate the feedback signals, and the digital analog converter converters the feedback signals from digital signals into analog signals and transmits the analog feedback signals to the power line; and wherein the communication module further includes a low-pass filter, a programmable gain driver, and coupling transformer, wherein the low-pass filter filters the analog feedback signals from the digital analog converter, and the programmable gain driver stabilizes the analog feedback signals from the low-pass filter by adjusting gains and transmits the analog feedback signals to the power line through the coupling transformer.

* * * * *